C. M. SMITH & J. M. SLEZINGER.
COFFEE POT.
APPLICATION FILED MAY 29, 1915.
1,189,010. Patented June 27, 1916.
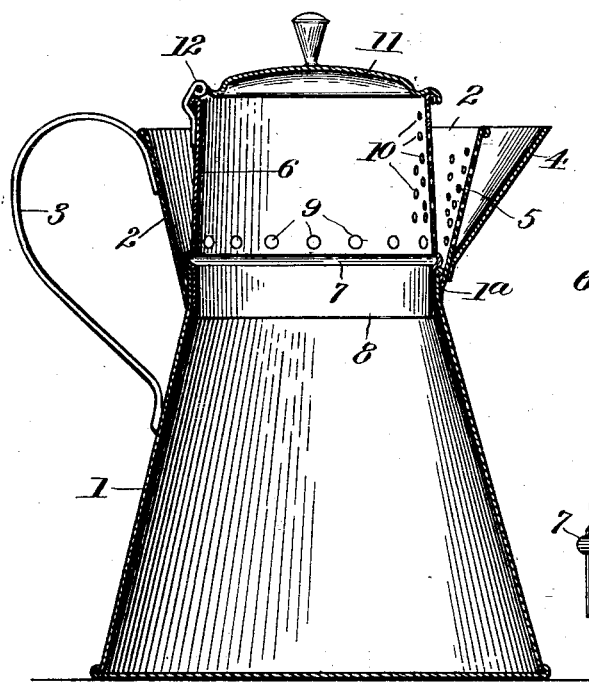
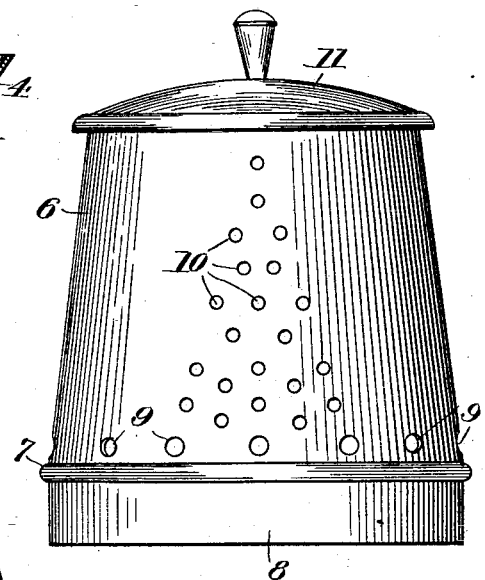
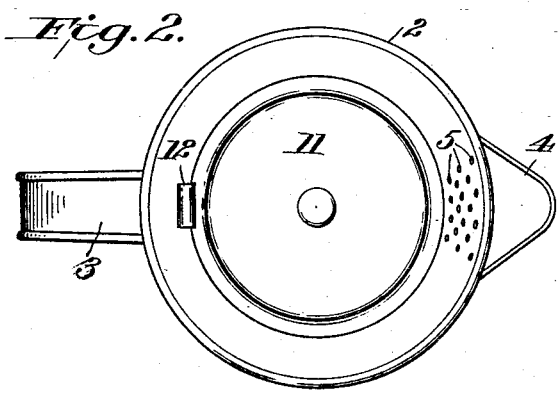
Inventors,
C. M. Smith
J. M. Slezinger.
By G. H. Davis
Attorney

UNITED STATES PATENT OFFICE.

CHARLES M. SMITH, OF NEW YORK, AND JOSEPH M. SLEZINGER, OF BROOKLYN, NEW YORK.

COFFEE-POT.

1,189,010.  Specification of Letters Patent.  Patented June 27, 1916.

Application filed May 29, 1915. Serial No. 31,294.

*To all whom it may concern:*

Be it known that we, CHARLES M. SMITH and JOSEPH M. SLEZINGER, citizens of the United States, residing, respectively, at New York, in the county and State of New York, and at Brooklyn, in the county of Kings and State of New York, have invented certain new and useful Improvements in Coffee-Pots, of which the following is a specification.

This invention relates to domestic cooking utensils, such as coffee pots and the like, and its object is to provide a simple and inexpensive pot of this character which will effectively prevent the contents from boiling over.

Attempts have heretofore been made to provide a coffee pot so designed that the contents cannot boil over, but the present invention presents important differences and marked advantages, as will hereinafter appear.

In order that the invention may be readily understood, reference is had to the accompanying drawing, forming a part of this specification, and in which, Figure 1 is a central vertical section through our improved coffee pot; Fig. 2 is a plan view of the top thereof; and, Fig. 3 is a side elevation on an enlarged scale of the inner removable member of the pot.

Referring to the drawings in detail, our improved pot comprises a main body section 1, which is preferably relatively large at the bottom and tapers upwardly to the top 1ª, which is relatively smaller, and an outwardly flaring auxiliary section 2, permanently united to the section 1 at the point 1ª. This section 2 is larger at the top than at the point 1ª. The usual handle 3 may be secured to the sections 1 and 2, as shown. A spout 4 is secured to the auxiliary section 2 above the point 1ª, and communicates with the interior of such section by means of a plurality of perforations 5, which also act as a strainer. Located within the upper section 2 of the pot is a removable drum or barrel 6, having near its bottom an annular bead or rib 7, and below this a flange 8, the latter being adapted to snugly fit within the smallest portion 1ª of the pot so as to frictionally hold the barrel in position. The rib 7 limits the downward movement of the barrel, as will be apparent. This barrel preferably tapers slightly upwardly and inwardly so that its top is smaller than its bottom, and so that an annular space is provided between the barrel and the auxiliary section 2, such space being widest at the top. Just above the rib 7 the barrel 6 is provided with a series of relatively large holes or openings 9, and adjacent the spout side of the pot the barrel is also provided with a plurality of perforations 10 to permit the free pouring of the contents of the pot.

The top of the barrel 6 is closed by means of a cover 11, hinged to the barrel at 12, while the annular space between the barrel and the section 2 remains open to the atmosphere.

In practice, should the pot be too strongly heated and the boiling liquid tend to rise therein, such liquid will flow freely out through the openings 9 into the annular space around the barrel. Such space being entirely open and unobstructed, permits of the rapid escape of steam. The higher the liquid tends to rise in this annular space, the greater is the surface presented for evaporation until finally a point is reached where the steam escapes so freely that further rising of the liquid is prevented. This action is due to the open upwardly flaring annular chamber which acts, as it were, to catch the overflow from the pot and permit the steam to escape and the contained liquid to cool. As soon as abnormal conditions are relieved, the liquid flows back into the pot through the holes 9. In some cases the liquid may even run over the top of barrel 6 into the said annular space, but we have found that so long as the flame is applied only to the bottom of the pot, the liquid will under no circumstances spill over the upper section 2.

When it is desired to pour the coffee, this may be done in the usual manner, the liquid flowing freely through the perforations 10 and 5 to the spout 4. The liquid will, of course, also flow through some of the holes 9 during the pouring operation.

What we claim is:

1. A coffee pot or the like comprising main and auxiliary body sections, said auxiliary or upper section being open at the top, a spout communicating with the auxiliary section above its junction with the main section, and a barrel fitting within said auxiliary section and having a series of openings therein adjacent the bottom thereof, whereby all liquid poured from the pot through said spout passes through said barrel.

2. A coffee pot or the like comprising a main body section smaller at the top than at the bottom, an auxiliary section united with the main section and larger at its top than at its junction point with the main section, a removable barrel located within the auxiliary section and frictionally held by engagement with the pot at the point of junction of the two sections, whereby an upwardly flaring annular space is formed between the barrel and the auxiliary section, said space being permanently open to atmosphere, said barrel having a series of openings establishing communication between the said annular space and the interior of the pot, and a spout communicating with said auxiliary section.

In testimony whereof we have affixed our signatures.

CHARLES M. SMITH.
JOSEPH M. SLEZINGER.

Witnesses:
MAX M. COHEN,
CHARLES M. BOSTWICK.

Copies of this patent may be obtained for five cents each, by addressing the "Commissioner of Patents, Washington, D. C."